United States Patent
Glista et al.

[11] Patent Number: 5,971,706
[45] Date of Patent: Oct. 26, 1999

[54] INTER-ROTOR BEARING ASSEMBLY

[75] Inventors: David G. Glista, Newmarket, N.H.; David W. Crall, Loveland; Christopher C. Glynn, Hamilton, both of Ohio

[73] Assignee: General Electric Company, Cincinnati, Ohio

[21] Appl. No.: 08/984,627

[22] Filed: Dec. 3, 1997

[51] Int. Cl.$^6$ .............................. F01D 25/00; F01D 25/16; F03B 11/06; F03B 11/00

[52] U.S. Cl. ....................... 415/229; 415/229; 415/170.1; 415/110; 415/230; 415/231; 384/99; 384/911; 384/912

[58] Field of Search ................................. 415/229, 170.1, 415/110, 230, 231; 384/99, 911, 912

[56]       References Cited

U.S. PATENT DOCUMENTS

| | | |
|---|---|---|
| 3,515,501 | 6/1970 | Palfreyman et al. . |
| 4,005,575 | 2/1977 | Scott et al. . |
| 4,046,430 | 9/1977 | Buono et al. . |
| 4,191,510 | 3/1980 | Teysseyre et al. . |
| 4,197,702 | 4/1980 | Robertson .................................. 60/262 |
| 4,201,426 | 5/1980 | Garten et al. . |
| 4,283,096 | 8/1981 | Picard et al. . |
| 4,289,360 | 9/1981 | Zirin . |
| 4,304,522 | 12/1981 | Newland . |
| 4,496,252 | 1/1985 | Horler et al. . |
| 4,521,160 | 6/1985 | Bouiller et al. . |
| 4,558,564 | 12/1985 | Bouiller et al. . |
| 4,693,616 | 9/1987 | Rohra et al. ............................. 384/99 |
| 4,762,466 | 8/1988 | Bouiller et al. . |
| 4,867,644 | 9/1989 | Wright et al. . |
| 4,919,594 | 4/1990 | Wright et al. . |
| 4,968,158 | 11/1990 | Atkinson et al. . |
| 4,969,326 | 11/1990 | Blessing et al. . |
| 4,971,458 | 11/1990 | Carlson . |
| 5,052,828 | 10/1991 | Ciokajlo . |
| 5,067,825 | 11/1991 | Vance et al. . |
| 5,160,251 | 11/1992 | Ciokajlo . |
| 5,260,137 | 11/1993 | Rosenthal et al. ..................... 428/608 |

FOREIGN PATENT DOCUMENTS 1187669  4/1970  United Kingdom .

*Primary Examiner*—Edward K. Look
*Assistant Examiner*—Rhonda Barton
*Attorney, Agent, or Firm*—Andrew C. Hess; Nathan D. Herkamp

[57]       ABSTRACT

An inter-rotor bearing assembly includes a first annular member having a circumferential inner surface and a second annular member having a circumferential outer surface. The outer surface is concentric to and disposed radially inward of the inner surface and a bearing is disposed between the surfaces. The bearing has an outer race fixedly attached to the first annular member along the inner surface, an inner race fixedly attached to the second annular member along the outer surface, and rolling elements disposed between the races. A low density high circumferential strength support ring is fixedly attached to the first annular member disposed concentrically outside of the inner race and is preferably made of a titanium matrix composite. The rolling elements may be cylindrical rollers having cylindrical rolling surfaces. The support ring may be fixedly attached around or integral with the first annular member.

13 Claims, 2 Drawing Sheets

INTER-ROTOR BEARING ASSEMBLY

The Government has rights to this invention pursuant to Contract No. F33615-942-4439 awarded by the United States Air Force.

BACKGROUND OF THE INVENTION

1. Field of the Invention

This invention relates to bearing assemblies for bearings disposed between concentric shafts of high and low pressure rotors of a gas turbine engine and particularly to such an assembly having a titanium matrix composite support ring surrounding the outer race of the assembly.

2. Discussion of the Background Art

A conventional gas turbine engine includes a core engine having in serial, axial flow relationship, a high pressure compressor to compress the airflow entering the core engine, a combustor in which a mixture of fuel and the compressed air is burned to generate a propulsive gas flow, and a high pressure turbine which is rotated by the propulsive gas flow and which is connected by a large diameter high pressure shaft to drive the high pressure compressor. A typical bypass turbofan engine also has a low pressure turbine aft of the high pressure turbine and which drives a forward fan forward of the high pressure compressor with a low pressure shaft concentrically disposed within the first shaft.

In order for intershaft differential bearings to function properly, the bearing races must remain in contact with the bearing. Typically, the inner race is positioned on the high pressure shaft which has a higher rotational speed and, thus, the inner race undergoes a higher radial growth or deflection as compared to the outer race which as positioned on the low pressure shaft and running at a lower rotational speed. This configuration is designed to have the inner race deflect or grow more in the radial direction than the outer race and, thus, provide that the races are always engaged. In order to achieve this required bearing support, complex hardware geometry is required to support the outer race on the low pressure shaft (see U.S. Pat. No. 4,558,564 for example). The present invention is designed to eliminate much of this complex hardware, simplify the inter-shaft bearing assembly and provide that the inner and outer races are always engaged with the rolling elements therebetween.

SUMMARY OF THE INVENTION

An inter-rotor bearing assembly includes a first annular member having a circumferential inner surface and a second annular member having a circumferential outer surface. The outer surface is concentric to and disposed radially inward of the inner surface and a bearing is disposed between the surfaces for allowing the annular members to rotate with respect to each other. The bearing has an outer race fixedly attached to the first annular member along the inner surface, an inner race fixedly attached to the second annular member along the outer surface, and rolling elements disposed between the races. A low density high circumferential strength support ring is fixedly attached to the first annular member disposed concentrically outside of the inner race. The support ring is preferably made of a material including a titanium matrix composite (TMC) having circumferentially extending ceramic fibers embedded in a titanium metal or alloy. The rolling elements may be cylindrical rollers having cylindrical rolling surfaces. The support ring is, in one exemplary embodiment of the present invention, fixedly attached around the first annular member. The support ring is, in an alternative exemplary embodiment of the invention, integral with the first annular member.

A more specific embodiment of the present invention provides that the first annular member is an annular portion of a gas turbine engine high pressure rotor and the second annular member is an annular portion of a gas turbine engine low pressure rotor. The support ring may be fixedly attached around the annular portion of the gas turbine engine high pressure rotor or integral with the annular portion of the gas turbine engine high pressure rotor. The first annular member may be an annular extension of a high pressure turbine disk of the high pressure rotor and the second annular member may be a low pressure shaft of the low pressure rotor. For this configuration, the support ring may be fixedly attached around the annular extension or integral with the annular extension.

ADVANTAGES OF THE INVENTION

The present invention simplifies the hardware configuration significantly allows a reduction of overall rotor and gas turbine engine weight and reduces centrifugal loads during engine rotor speed up and maneuvers. The present invention allows the outer race to be easily placed on the HP spool and have a simpler and stiffer configuration than prior art designs. The simplicity of the present invention also provides a cost reduction in both construction and servicing of the engine. The stiffer shaft also reduces the clearance change caused by inertial forces generated on the disks of the rotors during maneuvers. Reducing the disk deflections allows tighter blade tip clearances and improves efficiency of the turbine and the engine. A stiffer shaft also increases the engine system frequencies, which allows detrimental modes of vibration to be designed out of the operating range of the engine.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
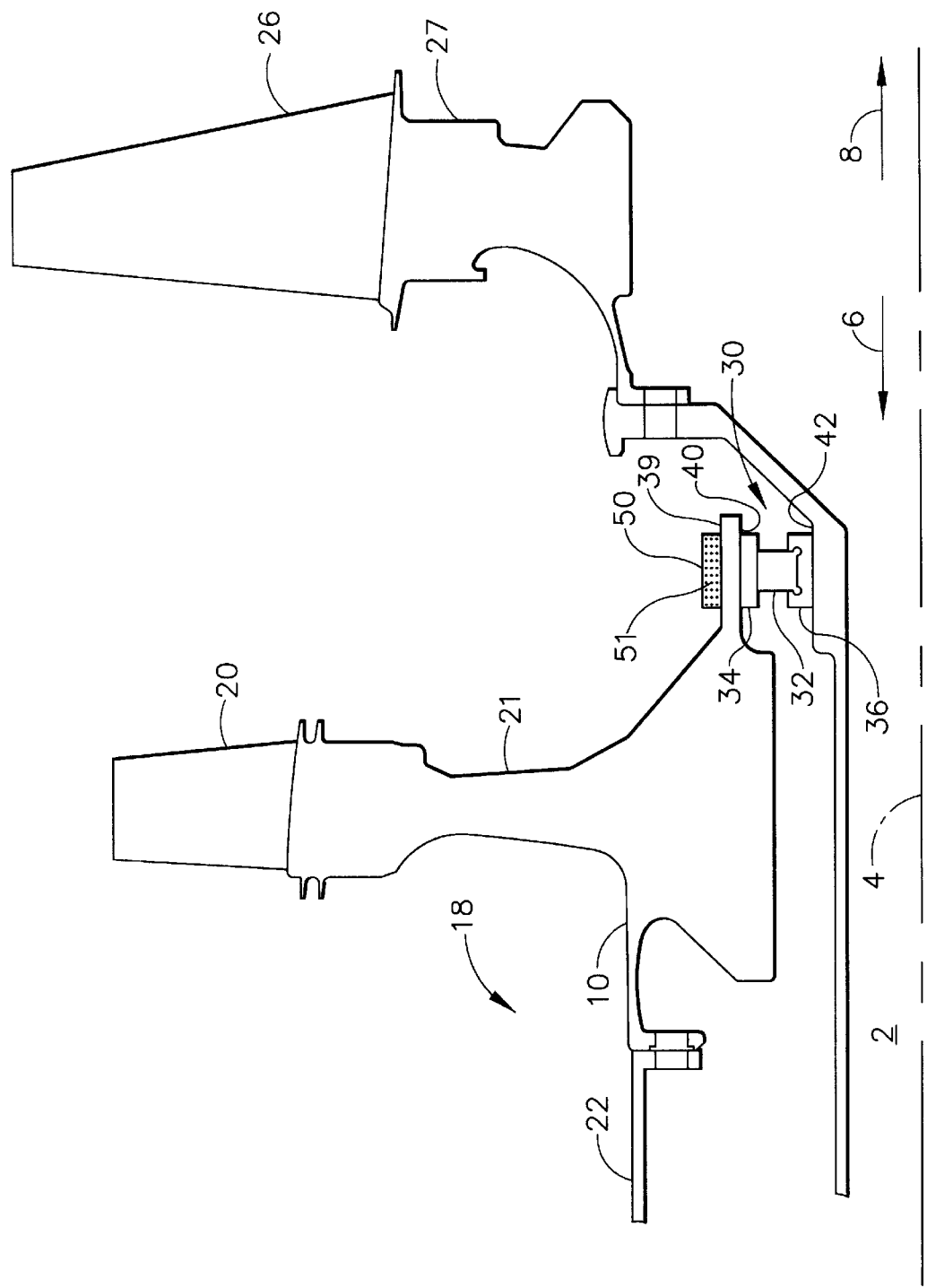
FIG. 1 is a cross-sectional view illustrating a bearing between coaxial rotors of a two rotor gas turbine engine in accordance with a first exemplary embodiment of the invention.

Referring now to the drawing, there is illustrated in FIG. 1 a portion of a gas turbine engine rotor assembly 2 having a generally longitudinally extending axis or centerline 4 generally extending in a forward direction 6 and an aft direction 8. A high pressure turbine rotor 10 (also referred to as a high pressure spool) includes a high pressure turbine (HPT) 18 having a row of high pressure turbine (HPT) blades 20 circumferentially and peripherally mounted on a high pressure turbine disk 21 that is fixedly interconnected in driving engagement to a larger diameter annular high pressure shaft 22 which is disposed coaxially about the centerline 4. A low pressure turbine rotor 23 (also referred to as a low pressure spool) includes a low pressure turbine (LPT) 24 having a row of low pressure turbine rotor (LPT) blades 26 circumferentially and peripherally mounted on a low pressure turbine rotor disk 27 that is fixedly attached to a smaller diameter annular low pressure shaft 28 disposed coaxially about the centerline 4 within the high pressure shaft 22.

Operatively disposed between the high pressure turbine rotor 10 and the low pressure turbine rotor 23 is an inter-shaft roller bearing 30 having a plurality of rollers or rolling elements 32 (one being shown) suitably retained between an outer race 34 and an inner race 36. The outer race 34 is suitably fixedly attached on a high pressure rotor inside surface 40 of the high pressure turbine rotor 10 and more specifically as illustrated in the FIGS. on an aft annular extension 39 of the high pressure turbine disk 21. The outer race 34 may be mounted elsewhere such as on the high pressure shaft 22. The inner race 36 is suitably fixedly attached on a low pressure rotor outside surface 42 of the low pressure shaft 28. The inside surface 40 faces radially inward towards the centerline 4 and the outside surface 42 faces radially outward away from the centerline 4. Cylindrical rolling elements 32 are illustrated in the embodiments illustrated herein but the invention may be used for other types of bearings such as spherical or ball bearings.

The low pressure shaft 28 rotates at a slower speed than the high pressure shaft 22 and, due to centrifugal loads, the outer race wants to grow radially at a faster rate than the inner race which would cause a looseness in the bearing which is highly undesirable. Therefore, a light weight or low density annular support illustrated in FIG. 1 as a support ring 50 is disposed radially outward of the outer race 34. The support ring 50 is fixedly attached to and concentrically outside of the aft annular extension 39 of the high pressure turbine disk 21. The low density high circumferential strength support ring 50 which may be made of a TMC material since TMC's have high strength, high stiffness and low density. The TMC material has titanium circumferentially running strands 51 and is, thus, able to with stand hoop stress due to growth of the bearing assembly under centrifugal loads without growing in the radial direction itself. TMC is a composite ceramic fiber/metal matrix member wherein a plurality of circumferentially extending ceramic fibers are each continuous circumferentially through at least 360 degrees of arc, and the metal matrix is made with titanium and is continuous circumferentially, radially, and axially. The metal matrix is continuous, or monolithic, throughout the entire extent of the composite member. U.S. Pat. No. 4,919,594 may be referenced for further information.

Figure 2:
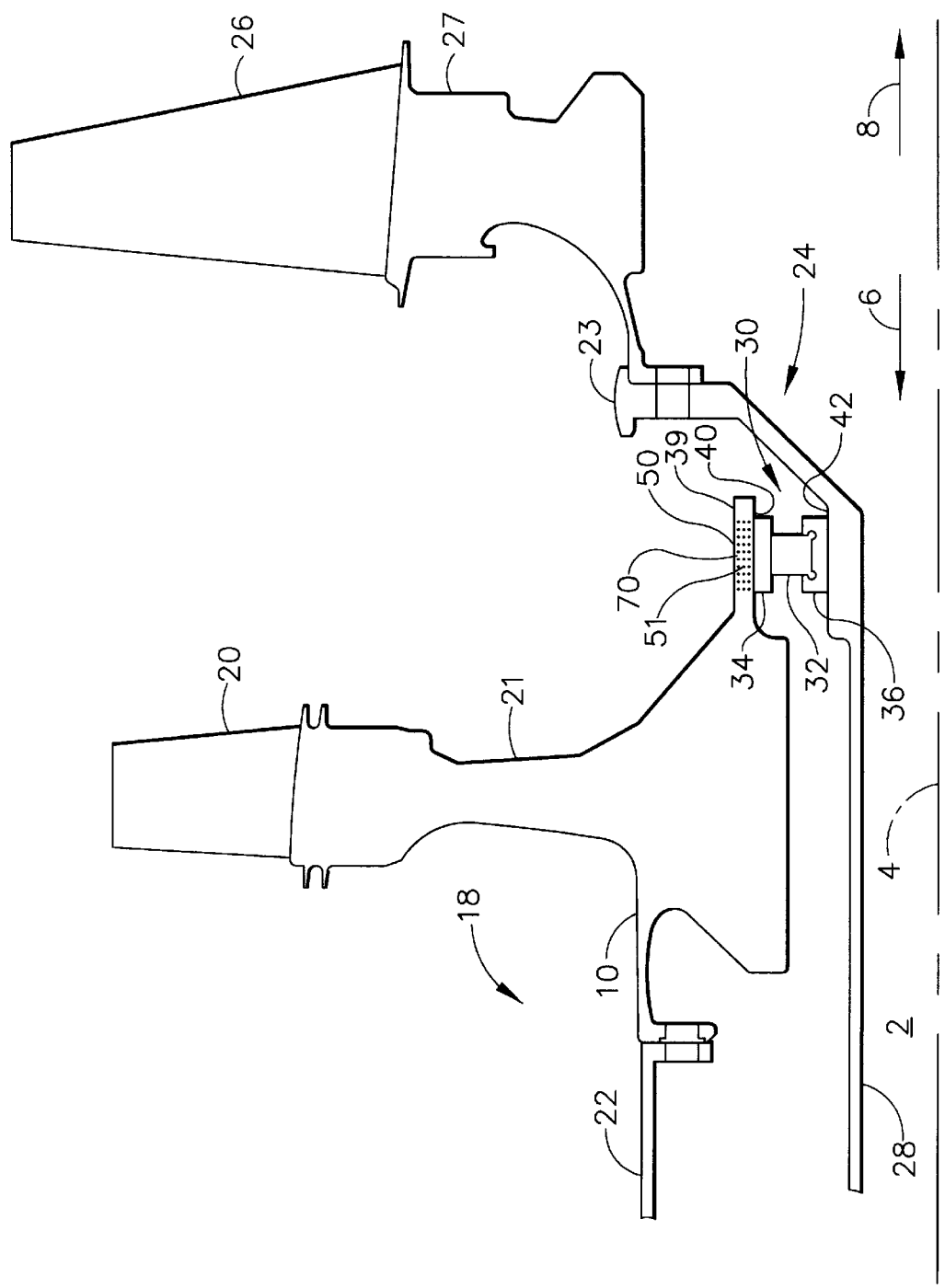
FIG. 2 is a cross-sectional view illustrating a bearing between coaxial rotors of a two rotor gas turbine engine in accordance with a second exemplary embodiment of the invention.

An alternative embodiment, illustrated in FIG. 2, integrates the light weight or low density annular support into an integrally TMC reinforced bearing support arm 70 of the aft annular extension 39 to which the outer race 34 is attached. The arm 70 is part of the HPT disk 21 and, therefore, may be considered an extension of the high pressure shaft 22. The invention as described herein is particularly useful in gas turbine engines having counter-rotating high and low pressure turbine rotors 10 and 23, respectfully, for which the relative inter-shaft rotational speeds are very high.

While the preferred embodiment of our invention has been described fully in order to explain its principles, it is understood that various modifications or alterations may be made to the preferred embodiment without departing from the scope of the invention as set forth in the appended claims.

What is claimed is:

1. An inter-rotor bearing assembly comprising:

a first annular member having a circumferential inner surface, a second annular member having a circumferential outer surface, said outer surface being concentric to and disposed radially inward of said inner surface, a bearing disposed between said surfaces for allowing said annular members to rotate with respect to each other, said bearing having an outer race fixedly attached to said first annular member along said inner surface and an inner race fixedly attached to said second annular member along said outer surface and rolling elements disposed between said races, a low density and higher circumferential strength high circumferential strength support ring fixedly attached to said first annular member disposed concentrically outside of said inner race, and said support ring is made from a first material and said first annular member is made from a second material, wherein said first material has a lower density than said second material.

2. An inter-rotor bearing assembly comprising:

a first annular member having a circumferential inner surface, a second annular member having a circumferential outer surface, said outer surface being concentric to and disposed radially inward of said inner surface, a bearing disposed between said surfaces for allowing said annular members to rotate with respect to each other, said bearing having an outer race fixedly attached to said first annular member along said inner surface and an inner race fixedly attached to said second annular member along said outer surface and rolling elements disposed between said races, a low density high circumferential strength support ring fixedly attached to said first annular member disposed concentrically outside of said inner race, and said support ring is made of a material comprising a titanium matrix composite having circumferentially extending ceramic fibers embedded in a titanium containing metal.

3. An assembly as claimed in claim 2 wherein said rolling elements are cylindrical rollers having cylindrical rolling surfaces.

4. An assembly as claimed in claim 3 wherein said support ring is fixedly attached to and concentric around said first annular member.

5. An assembly as claimed in claim 3 wherein said support ring is integral with said first annular member.

6. An assembly as claimed in claim 3 wherein said first annular member is an annular portion of a gas turbine engine high pressure rotor and said second annular member is an annular portion of a gas turbine engine low pressure rotor.

7. An assembly as claimed in claim 6 wherein said support ring is fixedly attached around said annular portion of said gas turbine engine high pressure rotor.

8. An assembly as claimed in claim 6 wherein said support ring is integral with said annular portion of said gas turbine engine high pressure rotor.

9. An assembly as claimed in claim 6 wherein said first annular member is a high pressure turbine disk of said high pressure rotor having an annular extension, said second annular member is a low pressure shaft of said low pressure rotor, and said support ring is fixedly attached to and concentric around said annular extension.

10. An assembly as claimed in claim 9 wherein said support ring is fixedly attached around said annular extension.

11. An assembly as claimed in claim 9 wherein said support ring is integral with said annular extension.

12. An inter-rotor bearing assembly comprising:

a high pressure turbine disk with an annular extension having a circumferential inner surface, a low pressure shaft of a low pressure rotor having a circumferential outer surface, said outer surface being concentric to and disposed radially inward of said inner surface, a bearing disposed between said surfaces for allowing said high pressure turbine disk and said low pressure rotor to rotate with respect to each other, said bearing having an outer race fixedly attached to said annular extension along said inner surface and an inner race fixedly attached to said low pressure shaft along said outer surface and rolling elements disposed between said races, a low density high circumferential strength support ring fixedly attached to said annular extension and disposed concentrically outside of said annular extension, and said support ring is made from a first material and said annular extension is made from a second material, wherein said first material has a lower density and higher circumferential strength than said second material.

13. An assembly as claimed in claim 12 wherein said first material is a material comprising a Titanium matrix composite having circumferentially extending ceramic fibers embedded in a Titanium containing metal.

* * * * *